United States Patent
Park et al.

(10) Patent No.: US 8,011,195 B2
(45) Date of Patent: Sep. 6, 2011

(54) KIMCHI REFRIGERATOR AND CONTROL METHOD OF THE SAME

(75) Inventors: Eun Young Park, Ulsan (KR); Yeon Yi Hwang, Busan (KR); Jong Min Shin, Busan (KR)

(73) Assignee: LG Electronics Inc., Seoul (KR)

( * ) Notice: Subject to any disclaimer, the term of this patent is extended or adjusted under 35 U.S.C. 154(b) by 563 days.

(21) Appl. No.: 11/655,293

(22) Filed: Jan. 19, 2007

(65) Prior Publication Data

US 2008/0066485 A1 Mar. 20, 2008

(30) Foreign Application Priority Data

Sep. 18, 2006 (KR) .......................... 10-2006-0090220
Sep. 18, 2006 (KR) .......................... 10-2006-0090221

(51) Int. Cl.
G05D 23/32 (2006.01)
F25D 29/00 (2006.01)
F25D 11/02 (2006.01)
A23B 4/12 (2006.01)

(52) U.S. Cl. ................ 62/157; 62/441; 62/158; 62/161; 62/208; 426/7

(58) Field of Classification Search ................ 62/157, 62/441, 158, 155, 161, 162, 163, 208, 267; 426/7

See application file for complete search history.

(56) References Cited

U.S. PATENT DOCUMENTS

| | | | |
|---|---|---|---|
| 5,931,010 A * | 8/1999 | Kim | 62/157 |
| 2004/0216472 A1 | 11/2004 | Cho | |
| 2005/0178131 A1* | 8/2005 | Ryu et al. | 62/131 |

FOREIGN PATENT DOCUMENTS

| | | |
|---|---|---|
| CN | 1074117 | 7/1993 |
| CN | 1611893 A | 5/2005 |
| JP | 11-225668 | 8/1999 |
| KR | 10-2000-0055093 | 9/2000 |
| KR | 1020000059951 | 10/2000 |
| KR | 10-2001-0017976 | 3/2001 |
| KR | 10-2002-0041686 | 6/2002 |
| KR | 10-2005-0018128 | 2/2005 |
| KR | 10-2006-0105731 | 10/2006 |

OTHER PUBLICATIONS

CN1611893, May 2005, Pia Enying; Machine Translation.*
Korean Notice of Allowance dated Nov. 10, 2008.
Chinese Patent Gazette (Application No. 200710088110.8) dated Mar. 24, 2010.

* cited by examiner

*Primary Examiner* — Ljiljana (Lil) V Ciric
*Assistant Examiner* — Travis Ruby
(74) *Attorney, Agent, or Firm* — KED & Associates, LLP

(57) ABSTRACT

A Kimchi refrigerator that applies cold shock to Kimchi stored therein at predetermined time intervals, while a keeping mode is performed, so as to improve the taste of the Kimchi, wherein the time intervals are changed, and a control method of the same are disclosed. The Kimchi refrigerator includes a cooling system to cool the interior of the refrigerator in which Kimchi is stored, and a control unit to control the cooling system to perform a cold shock operation in which the interior of the refrigerator is cooled to a cold shock temperature lower than a keeping temperature at predetermined time intervals, for a predetermined period of time, while a keeping mode is performed. The control unit changes the time intervals.

31 Claims, 8 Drawing Sheets change from t1 to t2

KIMCHI REFRIGERATOR AND CONTROL METHOD OF THE SAME

CROSS-REFERENCE TO RELATED APPLICATION

This application claims the benefit of Korean Patent Application No. 10-2006-0090220 filed on Sep. 18, 2006, which is hereby incorporated by reference in its entirety.

BACKGROUND OF THE INVENTION

1. Field of the Invention

The present invention relates to a Kimchi refrigerator, and more particularly, to a Kimchi refrigerator that applies cold shock to Kimchi stored therein at predetermined time intervals, while a keeping mode is performed, so as to improve the taste of the Kimchi, wherein the time intervals are changed, and a control method of the same.

2. Discussion of the Related Art

Not only Kimchi but also other kinds of food are stored in an ordinary refrigerator. For this reason, a door of the refrigerator is frequently opened and closed with the result that the interior temperature of the refrigerator is greatly changed. In addition, when a user takes the Kimchi out of the refrigerator so as to put the Kimchi in a vessel, the Kimchi is brought into contact with external air. As a result, the taste of the Kimchi is greatly changed, and therefore, it is very difficult to maintain the Kimchi for a long period of time in a state in which the Kimchi provides a taste desired by the user.

Furthermore, the ordinary refrigerator does not have a function to ferment to rapidly ripen the Kimchi such that the taste of the Kimchi is suitable to user's taste.

A Kimchi refrigerator has been developed to solve the problems of the ordinary refrigerator. Specifically, the Kimchi refrigerator is an exclusive refrigerator for Kimchi that is capable of fermenting to ripen the Kimchi according to a user's taste irrespective of external environment, such as seasons, and maintaining the taste of the ripened Kimchi for a long period of time.

A brief description will be given below as to how storage compartments of a Kimchi refrigerator are cooled by a cooling system mounted in the Kimchi refrigerator.

Refrigerant used for the Kimchi refrigerator is compressed into a high temperature and high pressure state by a compressor, and the high-temperature and high-pressure refrigerant is transmitted to a condenser through a refrigerant pipe. Subsequently, the refrigerant is liquefied by the condenser, and the liquefied refrigerant is transmitted to an expansion valve through a refrigerant pipe. The refrigerant is changed into a low temperature and low pressure state by the expansion valve. The low-temperature and low-pressure refrigerant is transmitted to an evaporator, which is mounted such that the evaporator surrounds the outsides of the storage compartments. The refrigerant is evaporated by the evaporator. As a result, the refrigerant instantaneously takes heat away from the periphery of the refrigerant, and therefore, the storage compartments, in which Kimchi is stored, are cooled.

Hereinafter, the storage compartment structure of a conventional Kimchi refrigerator will be described with reference to FIG. 1.

A conventional Kimchi refrigerator 10 includes upper Kimchi storage compartments 21 to store Kimchi and lower Kimchi storage compartments 31 to store Kimchi. The conventional Kimchi refrigerator 10 also includes upper doors 27 to open and close the corresponding upper Kimchi storage compartments 21 in a hingedly rotating fashion, and lower doors 37 to open and close the corresponding lower Kimchi storage compartments 31 in a sliding fashion.

The upper doors 27 are mounted at the top part of a refrigerator body of the Kimchi refrigerator 10 to open and close the corresponding upper Kimchi storage compartments 21, whereas the lower doors 37 are mounted at the front part of the refrigerator body of the Kimchi refrigerator 10 to open and close the corresponding lower Kimchi storage compartments 31. The upper doors 27 are constructed in a structure in which the upper doors 27 are opened and closed in a hingedly rotating fashion, whereas the lower doors 37 are constructed in a structure in which the lower doors 37 are opened and closed in a sliding fashion.

The doors 27 and 37 may be made of the same material as the refrigerator body of the Kimchi refrigerator 10. In addition, the doors 27 and 37 may be filled with a heat insulating material. Gaskets (not shown) are mounted at the edges of the respective upper and lower doors 27 and 37 to seal the Kimchi storage compartments 21 and 31, thereby preventing the inflow and outflow of air between the Kimchi storage compartments 21 and 31 and the outside of the Kimchi refrigerator 10.

Although not shown, on the other hand, an additional machinery compartment is located in the refrigerator body of the Kimchi refrigerator 10. In the machinery compartment are mounted several parts for a cooling system such as a compressor to compress refrigerant flowing through an evaporator while the parts are connected with each other. In addition, various parts such as various kinds of control units and various kinds of sensors, which are necessary to ripen Kimchi and store the Kimchi for a long period of time, are mounted at predetermined positions in the Kimchi refrigerator 10.

At the front part of the refrigerator body of the Kimchi refrigerator 10 is mounted a control panel 40 to control the overall operation of the Kimchi refrigerator.

In the above, the Kimchi refrigerator in which the Kimchi storage compartments are located at the upper and lower parts of the Kimchi refrigerator was described as an example. However, a Kimchi refrigerator in which the upper and lower parts are not divided from each other or a Kimchi refrigerator in which refrigerating compartments to store various kinds of food or freezing compartments to store various kinds of food are integrally coupled with each other may be also used.

Although the Kimchi refrigerator has been developed to maintain the taste of the Kimchi for a long period of time, however, the Kimchi refrigerator still has the following problems.

In the conventional Kimchi refrigerator, after Kimchi is ripened into a desired state by user's inputting of various conditions, such as kinds of the Kimchi, keeping temperature and storage time of the Kimchi, and ripening degree of the Kimchi, the Kimchi is stored merely at a specific keeping temperature.

Even though the Kimchi is stored at the specific keeping temperature, however, the Kimchi is gradually fermented. Especially, the growth of *Lactobacillus Plantarum* (hereinafter, simply referred to as "*Lactobacillus*"), which is a bacillus causing acidification of the Kimchi and thus providing a sour taste to the Kimchi, is increased, whereby the taste of the Kimchi is deteriorated.

The above-mentioned problem may shorten a Kimchi storage period in the keeping mode.

Furthermore, in the conventional Kimchi refrigerator, even though the user opens the door of the Kimchi refrigerator, and therefore, the interior temperature of the refrigerator is increased with the result that the quality of the Kimchi is affected, it is not possible to control the interior temperature of the refrigerator so as to maintain the quality of the Kimchi. As a result, the taste of the Kimchi is not maintained for a desired period of time, and therefore, the quality of the Kimchi is deteriorated, or it is very difficult to store the Kimchi for a long period of time.

For example, when the temperature of the Kimchi is increased, the growth of Lactobacillus plantarum is further accelerated, whereby a sour taste of the Kimchi is increased. Consequently, the long-term storage of the Kimchi is very difficult.

SUMMARY OF THE INVENTION

Accordingly, the present invention is directed to a Kimchi refrigerator and a control method of the same that substantially obviate one or more problems due to limitations and disadvantages of the related art.

An object of the present invention is to provide a Kimchi refrigerator that is capable of applying cold shock to Kimchi stored therein at predetermined time intervals, while a keeping mode is performed, thereby maintaining the taste of the Kimchi without change in quality of the Kimchi for a long period of time, and a control method of the same.

Another object of the present invention is to provide a Kimchi refrigerator that is capable of effectively corresponding to environmental changes, such as the change of interior temperature of the refrigerator and the opening of a door of the refrigerator, so as to restrain the generation of a sour taste of Kimchi, thereby maintaining the taste of the Kimchi for a long period of time in a state in which the Kimchi provides a taste desired by the user, and a control method of the same.

A further object of the present invention is to provide a Kimchi refrigerator that is capable of changing time intervals in which cold shock is applied to Kimchi depending upon the amount of the Kimchi stored in the Kimchi refrigerator so as to perform a cold shock operation based on the amount of the Kimchi, thereby more efficiently maintaining the taste of the Kimchi, and a control method of the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a Kimchi refrigerator according to the present invention includes a cooling system to cool the interior of the refrigerator in which Kimchi is stored, and a control unit to control the cooling system to perform a cold shock operation in which the interior of the refrigerator is cooled to a cold shock temperature lower than a keeping temperature at predetermined time intervals, for a predetermined period of time, while a keeping mode is performed. The time intervals can be changed by the control unit.

Generally, when a user makes Kimchi, puts the Kimchi in the Kimchi refrigerator, and selects a desired taste of the Kimchi by, for example, selecting the kind of Kimchi, the control unit controls a fermentation mode to be performed such that the Kimchi can be quickly fermented and ripened through the fermentation mode and then a keeping mode to be performed such that the Kimchi can be stored for a long period of time in the ripened state.

According to the present invention, while the keeping mode is performed, the cold shock operation is performed at the predetermined time intervals for the predetermined period of time.

The cold shock operation may be performed immediately after the mode is changed from the fermentation mode to the keeping mode. Alternatively, the cold shock operation may be performed according to the user's command or automatically after the keeping mode is performed for a predetermined period of time.

The control unit controls the cooling system to maintain the interior temperature of a storage compartment at a specific keeping temperature level in the keeping mode.

At this time, the control unit controls the cooling system to perform the cold shock operation at the predetermined time intervals while the keeping mode is performed.

Also, the control unit changes the time intervals, thereby changing the time intervals at which the cold shock operation is performed.

The cold shock operation is an operation to cool the interior of the storage compartment to a cold shock temperature lower than a keeping temperature of the keeping mode for a predetermined period of time. The cold shock operation restrains the growth of Lactobacillus, which provides a sour taste to the Kimchi.

Preferably, the Kimchi refrigerator further includes a detection unit to detect the amount of the Kimchi received in the storage compartment, and the control unit changes the time intervals based on the amount of the Kimchi detected by the detection unit.

In the initial stage of the keeping mode, the amount of the Kimchi may be relatively large. With the passage of time, however, the Kimchi is gradually consumed with the result the amount of the Kimchi is reduced. Consequently, the control unit changes the time intervals of the cold shock operation in consideration of the change in the amount of the Kimchi.

The detection unit may include one or more weight sensors to detect the weight of the Kimchi received in the storage compartment.

Alternatively, the detection unit may include other sensors different from the weight sensors. For example, the amount of the Kimchi may be detected based on the number of Kimchi storage containers. In this case, limit switches can be mounted at the wall of the storage compartment at predetermined height intervals so as to detect the amount of the Kimchi based on the switched number of the limited switches. Alternatively, distinguishable stickers may be attached to the Kimchi storage containers, and sensors to recognize the stickers to count the number of the containers may be mounted at the storage compartment.

According to circumstances, a user may be allowed to input the number of the Kimchi storage containers such that the amount of the Kimchi can be detected based on the number of the Kimchi storage containers.

Other various methods may be used to detect the amount of the Kimchi in addition to the above-mentioned examples.

After the amount of the Kimchi is detected using any one of the above-described methods, the time intervals of the cold shock operation are changed based on the detected amount of the Kimchi. Preferably, the time intervals of the cold shock operation are increased as the amount of the Kimchi is reduced.

Meanwhile, the Kimchi refrigerator may have an input unit such that the user can change the time intervals without using the detection unit. In this case, the control unit changes the time intervals into the value input by the user, and controls the cold shock operation to be repeatedly performed.

Preferably, the keeping mode includes a first keeping mode controlled at a first keeping temperature and a second keeping mode controlled at a second keeping temperature. The second keeping temperature is lower than the first keeping temperature.

The cold shock operation can not be performed in the first keeping mode but in the second keeping mode at the predetermined time intervals.

More preferably, the Kimchi refrigerator may have an input unit, such as an input button, to allow a user to select a point of time when the mode is changed from the first keeping mode to the second keeping mode. Even in the first keeping mode, the Kimchi is gradually fermented. At this time, when the Kimchi is fermented to the degree that the taste of the Kimchi is suitable to the user's taste, the user may press the input button. As a result, the control unit controls the cooling system to change the mode from the first keeping mode to the second keeping mode. Also, the control unit controls the cooling system to perform the cold shock operation at the predetermined time intervals in the second keeping mode.

As the mode change is performed from the first keeping mode to the second keeping mode, and the cold shock operation is repeatedly performed at the predetermined time intervals, the taste of the Kimchi selected by the user is maintained for a long period of time with the minimum deterioration of the taste of the Kimchi.

According to circumstances, the input button to allow the user to select the cold shock operation and the input button to allow the user to input the command for the mode change from the first keeping mode to the second keeping mode may be separately provided.

Preferably, the cold shock operation is performed once when the keeping mode is initiated, and is then continuously performed at predetermined time intervals.

Also preferably, the cold shock operation is performed at least once after a door is opened and then closed. The detection of the opening and closing of the door may be performed using a door sensor.

The door sensor may be a well-known conventional door sensor.

Alternatively, the cold shock operation may be performed when the interior temperature of the storage compartment exceeds a predetermined temperature level. In the keeping mode, the storage compartment is controlled to be maintained at the predetermined temperature. At this time, the interior temperature of the storage compartment may be increased. Even in this case, it is preferable to perform the cold shock operation.

Especially, when a user opens the door and maintains the door in the opened state for a specific period of time so as to take some of the Kimchi out of the storage compartment, cool air in the storage compartment is discharged to the outside. In this case, it is necessary to supply more cool air into the storage compartment. The cold shock operation is performed so as to apply cold shock to the Kimchi beyond the degree of cool air supply, thereby improving the taste of the Kimchi.

For example, the user may withdraw the Kimchi storage container from the storage compartment and take some of the Kimchi out of the Kimchi storage container. At this time, the interior of the storage container and the Kimchi stored in the storage container are exposed to external warm air. As a result, the external warm air is introduced to the Kimchi, and therefore, the external warm air remains inside the Kimchi.

The warm air introduced into the interior of the Kimchi storage container or remaining inside the Kimchi accelerates the growth of Lactobacillus. As a result, the sour taste of the Kimchi is further increased.

When the cold shock operation is performed, however, the temperature of the warm air introduced into the interior of the Kimchi storage container or remaining inside the Kimchi is rapidly lowered, and therefore, cold shock is applied to the Kimchi. As a result, the growth of the Lactobacillus is restrained, and therefore, the sour taste of the Kimchi is not increased.

Consequently, the cold shock operation is performed at predetermined time intervals, whereby the taste of the Kimchi is maintained.

In the cold shock operation, it is possible to perform a control operation such that the interior temperature of the storage compartment is increased and returned to the predetermined interior temperature of the storage compartment as soon as the interior temperature of the storage compartment reaches the cold shock temperature. Alternatively, when the interior temperature of the storage compartment reaches the cold shock temperature, the storage compartment may be maintained at the cold shock temperature for a predetermined period of time, and then the interior temperature of the storage compartment may be increased and returned to the predetermined interior temperature of the storage compartment. The cold shock may be applied in the shape of a chopping wave or a rectangular wave.

In the cold shock operation, the cold shock temperature is preferably −4° C. or −5° C. Alternatively, the cold shock temperature may have appropriate other different values. For example, the cold shock temperature may be changed depending upon the amount of the Kimchi or the taste of the Kimchi.

Also, when the mode is changed from the fermentation mode to the keeping mode or when the mode is changed from the first keeping mode to the second keeping mode, it is preferable for the cooling speed to have a rapid cooling section.

The rapid cooling section is a section in which the cooling operation is performed faster than the average cooling speed for the mode change.

For example, when the cooling operation is performed from the first keeping mode to the second keeping mode for 13 hours, the average cooling speed for the mode change is (the first keeping temperature−the second keeping temperature)/13 hours. The rapid cooling section is a section in which the cooling operation is performed at a cooling speed faster than the average cooling speed. Preferably, the rapid cooling section has a cooling speed at which the cooling temperature is lowered by 4° C. per hour. According to circumstances, the rapid cooling section may have a cooling speed at which the cooling temperature is lowered by 5° C. per hour. Besides, the rapid cooling section may have a cooling speed at which the cooling temperature is lowered by 2° C. or 2.5° C. per hour. Of course, the cooling speed of the rapid cooling section may have appropriate other different values.

More preferably, the cooling speed at the time of the mode change is a multi-step cooling speed. For example, the cooling operation may be performed at high cooling speed at the initial stage, and then the cooling operation may be performed at gradually reduced cooling speeds. Preferably, the cooling speed for each stage is higher than the average cooling speed. However, it is also possible that the cooling speed has a rapid cooling section, and, after that, the cooling operation is performed at a cooling speed lower than the average cooling speed.

When the rapid cooling section is provided as described above, the mode change is rapidly performed, and therefore, it is possible to maintain the Kimchi in a delicious state. When the time for the mode change is increased, the sour taste of the Kimchi may be increased. Also, the growth of the Lactobacillus is restrained by the rapid cooling.

Meanwhile, a control method according to the present invention is a method of controlling the Kimchi refrigerator according to the present invention. The control method may be included in a microprocessor of the control unit as a program. Accordingly, a description of the control method is substituted by the previous description of the Kimchi refrigerator according to the present invention.

Kimchi is a Korean traditional food, which is usually fermented to have a good taste before eating. To make Kimchi well fermented, it is usually kept for a certain amount of time at a appropriate temperature. In addition, it is generally necessary that the fermented Kimchi is kept for a certain temperature, which is generally maintained in a small range comparing to the common food. The present invention can be used as a refrigerator for other fermented food like Kimchi. Accordingly, Kimchi needs to be understood as a fermented food in this specification.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
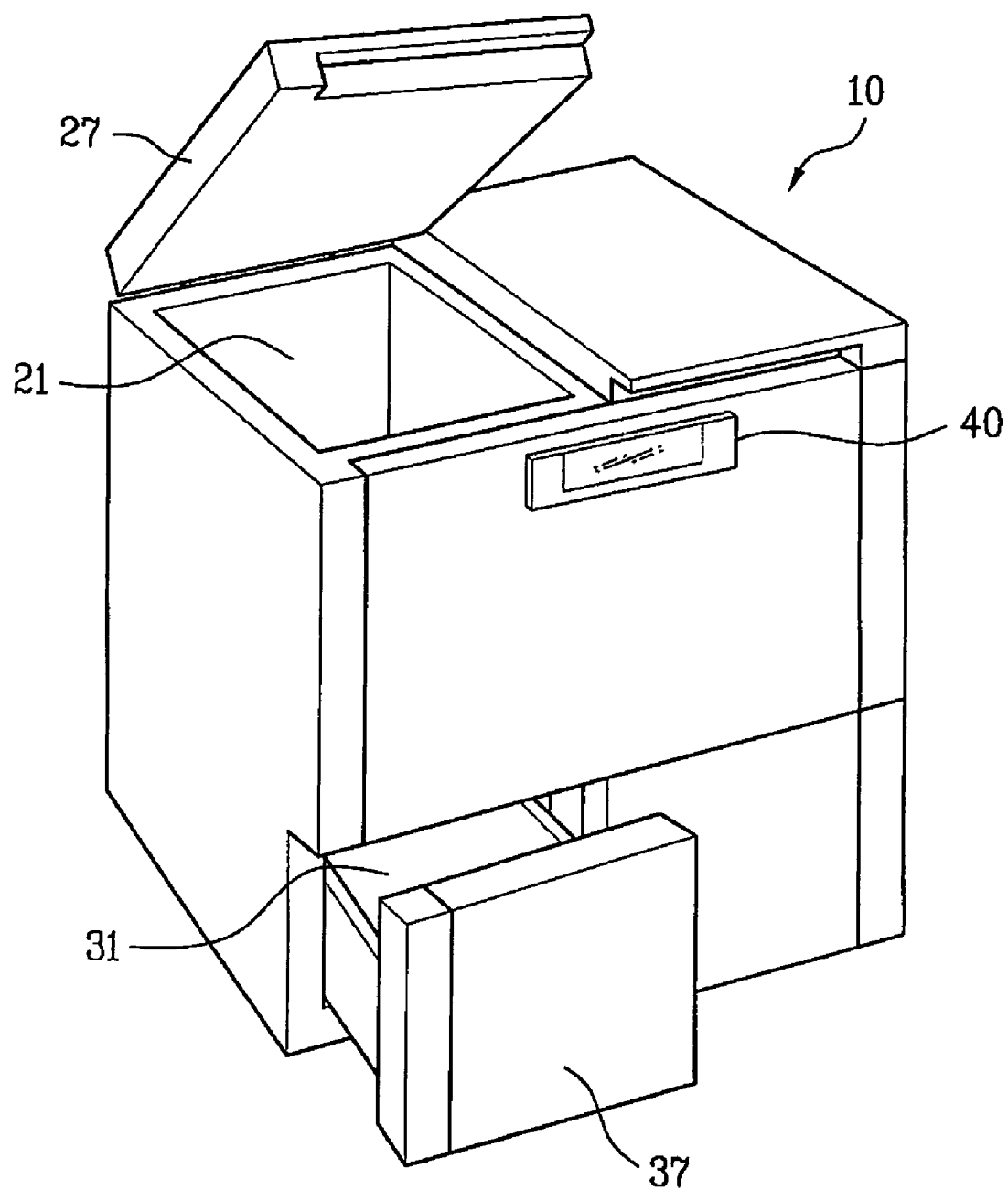
FIG. 1 is a perspective view illustrating a conventional Kimchi refrigerator.
Figure 2:
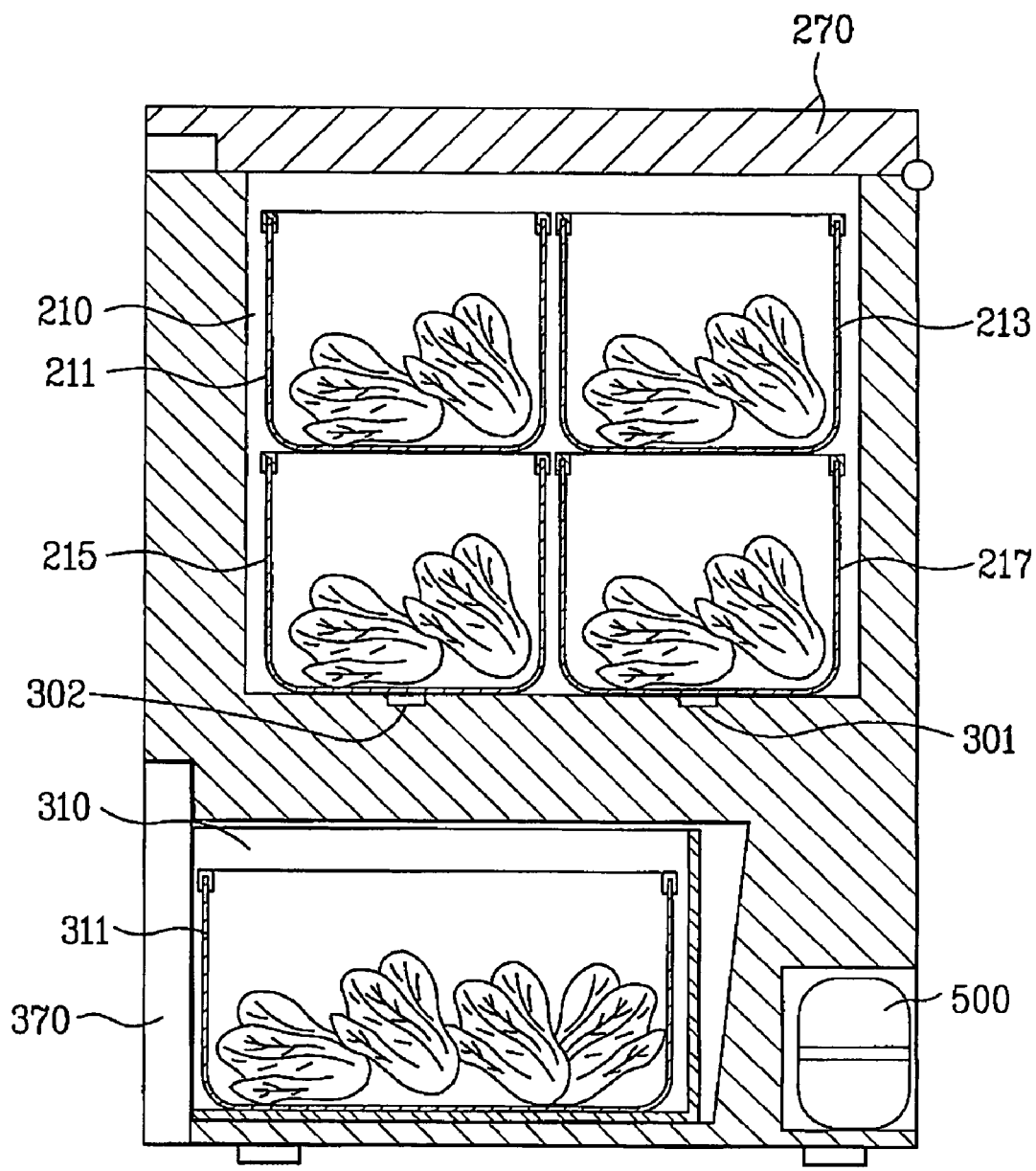
FIG. 2 is a sectional view illustrating a Kimchi refrigerator according to an embodiment of the present invention.

Referring to FIG. 2, a Kimchi refrigerator 100 basically comprises Kimchi storage compartments 210 and 310 to store Kimchi and a cooling system, including a compressor 500, to cool the Kimchi storage compartments 210 and 310. The Kimchi refrigerator 100 further comprises a control panel (not shown) mounted at the front part thereof, as shown in FIG. 1.

The control panel has an input unit to allow a user to input an operation command, a display unit, such as a liquid crystal screen, and a control unit to control the operation of the Kimchi refrigerator according to the operation command input by the user.

The Kimchi storage compartments 210 and 310 are receiving spaces to store Kimchi. The Kimchi storage compartments 210 and 310 are defined by a refrigerator body wall and a bottom surface of the Kimchi refrigerator. In this embodiment, as shown in FIG. 2, the Kimchi storage compartments 210 and 310 are divided into upper Kimchi storage compartments 210 and lower Kimchi storage compartments 310. The Kimchi storage compartments 210 and 310, which are located at the upper and lower parts of the Kimchi refrigerator, are divided into right and left Kimchi storage compartments. Consequently, the Kimchi refrigerator according to this embodiment of the present invention has four Kimchi storage compartments. According to circumstances, however, it is possible that the upper Kimchi storage compartments are divided into right and left Kimchi storage compartments without the provision of the lower Kimchi storage compartments.

In this embodiment, the upper Kimchi storage compartments 210 are constructed such that the upper Kimchi storage compartments 210 are opened and closed by upper doors 270 mounted at the top part of the refrigerator body by hinges, whereas the lower Kimchi storage compartments 310 are constructed such that the lower Kimchi storage compartments 310 are opened and closed by lower doors 370 in a sliding fashion.

Although not shown, on the other hand, it is preferable that gaskets (not shown) be mounted at the edges of the upper doors 270 and the lower doors 370 to prevent the inflow and outflow of air between the Kimchi storage compartments 210 and 310 and the outside of the Kimchi refrigerator 100.

As shown in FIG. 2, it is general that Kimchi is stored in the Kimchi storage compartments 210 and 310 while the Kimchi is received in Kimchi storage containers 211, 213, 215, 217 and 311 to store the Kimchi.

Also, the Kimchi refrigerator further comprises weight sensors 301 and 302 mounted at the bottom of each upper Kimchi storage compartment 210. The weight sensors 301 and 302 serve to detect the amount of the Kimchi stored in each upper Kimchi storage compartment 210.

Figure 3:
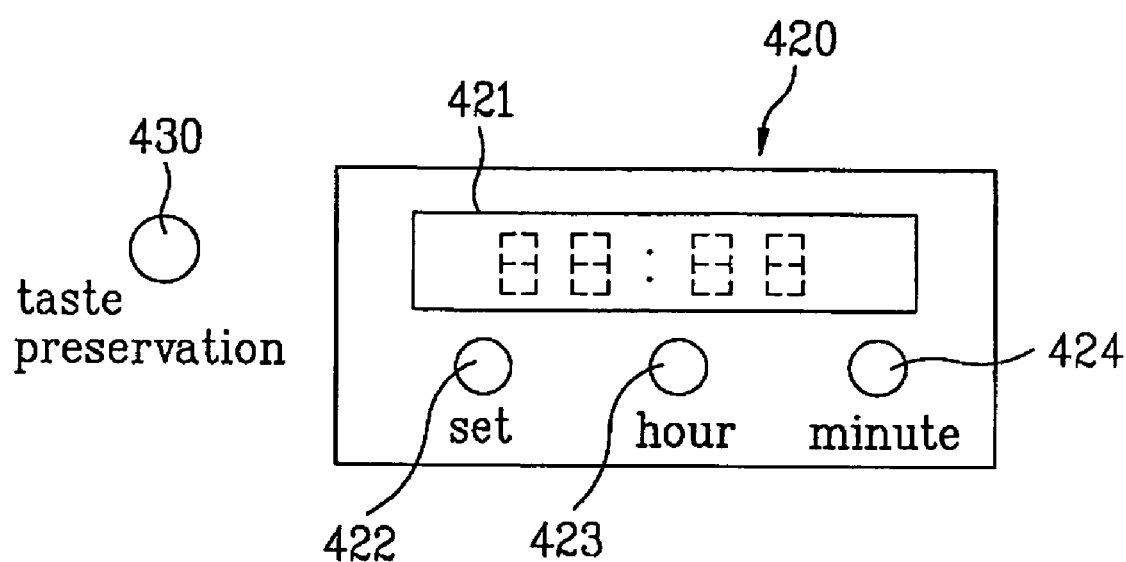
FIG. 3 is a view illustrating an input unit that can be included in the Kimchi refrigerator according to the present invention.

FIG. 3 is a view illustrating an input device 420, which is a part of the input unit, to allow a user to input the cycle of a cold shock operation.

As shown in FIG. 3, the input device 420 includes a set button 422 to allow the user to set or change the cycle of the cold shock operation, an hour button 423 to allow the user to input hours, and, a minute button 423 to allow the user to input minutes.

The input device 420 further includes a liquid crystal screen 421 to display the input time to the outside.

As shown in FIG. 3, the Kimchi refrigerator further comprises a "taste preservation" button 430, which will be described below.

The user may input the cycle of the cold shock operation through the input device 420 from the beginning. Also, the user may change the cycle of the cold shock operation through the input device 420.

The above-described input device 420 may not be included in the Kimchi refrigerator. In this case, the cycle of the cold shock operation is previously set in the control unit. When predetermined conditions are satisfied, the control unit changes the cycle of the cold shock operation based on a numerical formula previously set in the control unit. Even in this case, the input device 420 may be further included to change the cycle of the cold shock operation when such change is needed by the user.

When the user puts Kimchi into the Kimchi refrigerator, and then selects an appropriate course, the control unit controls the Kimchi refrigerator according to the selected course. For instance, the selected course is related to the kind of the Kimchi.

For example, when the user selects a specific course, the control unit controls the cooling system to perform a fermentation mode according to the selected course and a keeping mode for long-term storage of the Kimchi after the Kimchi is fermented.

Figure 4:
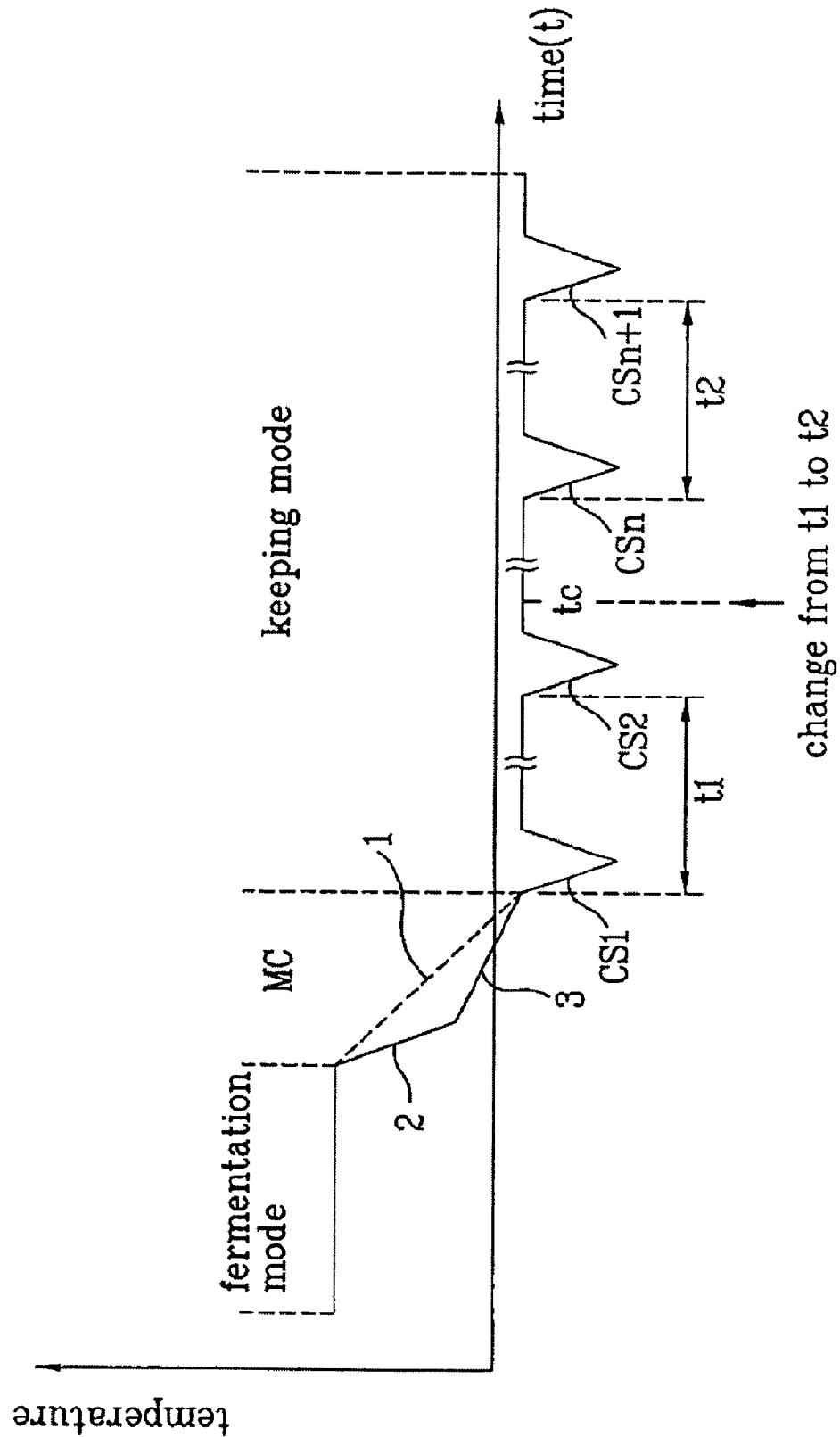
FIGS. 4 and 5 are views respectively illustrating processes for controlling the Kimchi refrigerator according to embodiments of the present invention.

FIG. 4 is a view illustrating a process in which a specific course is performed by the Kimchi refrigerator as an embodiment of the present invention.

First, a fermentation mode is performed to ferment and ripen Kimchi, and then a keeping mode is performed to store the Kimchi for a long period of time.

When the keeping mode is performed, a cold shock operation is performed first at a predetermined time interval t1 as a cycle. After that, the time interval is changed to t2 at a predetermined point of time tc. As a result, the cold shock operation is repeatedly performed at a time interval of t2.

Although not shown, the time interval may be changed from t2 to t3, t4 . . . tn.

The point of time and the value at which the cycle of the cold shock operation is changed may be decided based on the numerical formula previously set in the control unit depending upon the change of the amount of the Kimchi detected by the weight sensors shown in FIG. 2.

The point of time tc at which the cycle of the cold shock operation is changed may be a point of time at which the user operates the input device 420 shown in FIG. 3 to change the cycle of the cold shock operation. The cycle of the cold shock operation changed at this time is a value newly input by the user.

Preferably, the initial cycle of the cold shock operation is approximately 8 hours, and the time required until the interior temperature is returned to the keeping temperature after the commencement of the cold shock operation is approximately 15 minutes.

Meanwhile, when a mode change MC is performed, i.e., the mode is changed from the fermentation mode to the keeping mode, the cooling operation is performed at rapid cooling speeds 2 and 3 faster than the average cooling speed 1 for the mode change. Preferably, the first cooling speed 2 of the rapid cooling speeds is a cooling speed at which the cooling temperature is lowered by 4° C. per hour.

Figure 5:
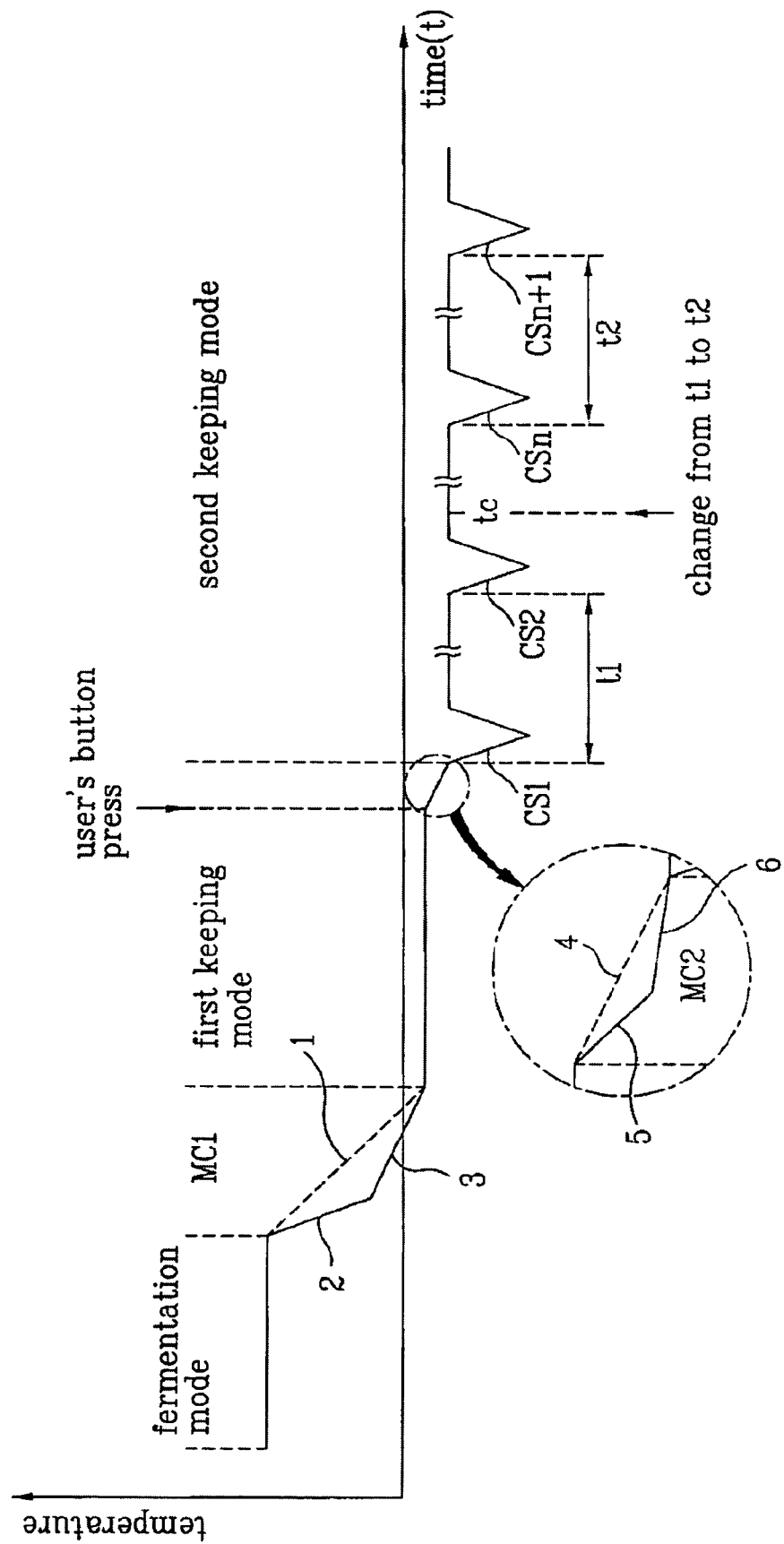

FIG. 5 illustrates another embodiment, which is different from FIG. 4.

Referring to FIG. 5, after a fermentation mode is completed, a mode change MC1 is performed from the fermentation mode to a keeping mode.

In the embodiment of FIG. 5, the keeping mode includes a first keeping mode and a second keeping mode. The keeping temperature of the second keeping mode is lower than that of the first keeping mode. Preferably, the first keeping temperature is −1° C., and the second keeping temperature is −1.5° C.

In this embodiment, a cold shock operation CS is performed in the second keeping mode; however, the cold shock operation CS is not performed in the first keeping mode.

Similarly, the cold shock operation CS is repeatedly performed at predetermined time intervals. The cycle of the cold shock operation is changed in the same manner as FIG. 4.

Also, when a mode change MC2 is performed from the first keeping mode to the second keeping mode, the cooling operation is performed at cooling speeds 5 and 6 faster than the average cooling speed 4 for the mode change MC.

As soon as the mode change is performed, as shown in FIGS. 4 and 5, the cold shock operation CS is performed once, and then the cold shock operation CS is repeatedly performed at predetermined time intervals.

Also, in this embodiment, when a user presses the taste preservation button 430 of FIG. 3 ("the user's button press" of FIG. 5), the mode change is performed from the first keeping mode to the second keeping mode as shown in FIG. 5, and the cold shock operation CS is performed.

The Kimchi is fermented to an appropriate degree in the fermentation mode. After that, the Kimchi is cooled to the first keeping temperature, and is then stored in the first keeping mode. In the first keeping mode, the taste of the Kimchi is gradually changed. At this time, when the user determines that the taste of the Kimchi is suitable to his/her taste, the user may press the taste preservation button 430. As a result, the mode change is performed from the first keeping mode to the second keeping mode, and the cold shock operation CS is performed.

As the mode change is performed from the first keeping mode to the second keeping mode, and the cold shock operation CS is performed, the taste of the Kimchi selected by the user is maintained for a long period of time without being changed.

FIGS. 4 and 5 illustrate the cases in which the performing of the cold shock operation CS and the returning to the keeping mode are performed in the shape of a chopping wave. In this case, when the keeping temperature reaches the cold shock temperature, the control unit stops the cold shock operation CS and controls the cooling system to increase the temperature of the storage compartment.

Figure 6:
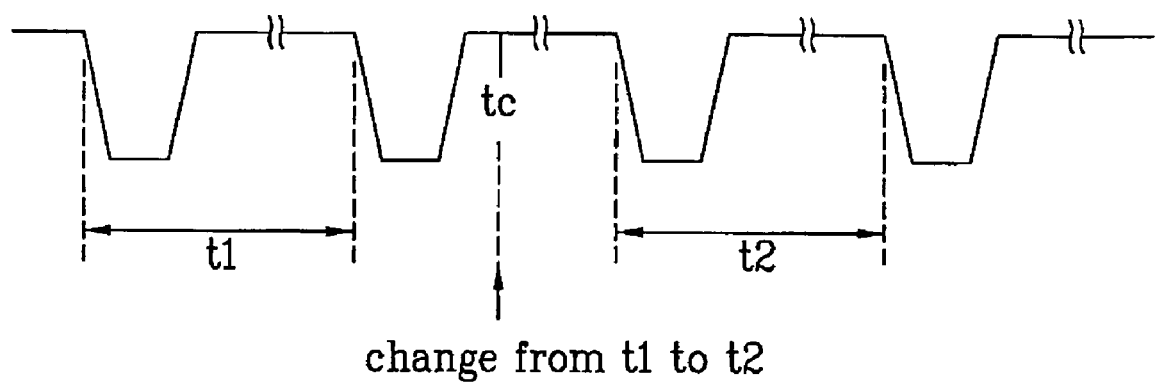
FIG. 6 is a view illustrating another form of cold shock operation.

FIG. 6 is a view illustrating another form of the cold shock operation CS. After the keeping temperature has reached the cold shock temperature, the keeping temperature is maintained for a predetermined period of time. In this embodiment, the performing of the cold shock operation CS and the returning to the keeping mode are performed in the shape of approximately a rectangular wave.

Figure 7:
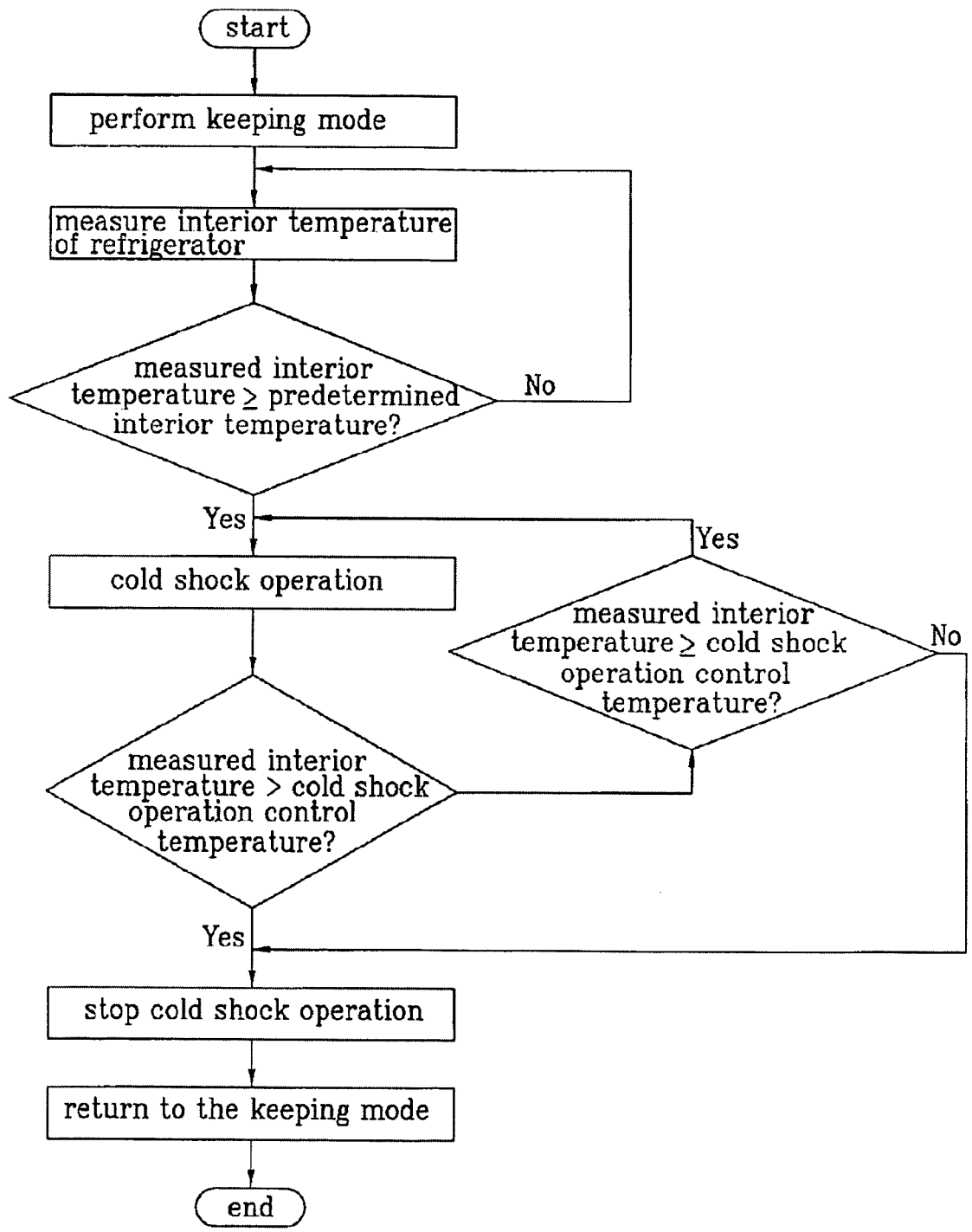
FIG. 7 is a block diagram illustrating a process for performing a cold shock operation when the interior temperature of the refrigerator is increased.

FIG. 7 is a block diagram illustrating a process for performing a cold shock operation when the interior temperature of the refrigerator, i.e., the interior temperature of the storage compartment, exceeds a predetermined temperature level while the keeping mode is performed.

As shown in FIG. 7, the interior temperature of the storage compartment, in which Kimchi is stored, is continuously detected by a temperature sensor (not shown) mounted in the refrigerator while the keeping mode is performed.

The detected interior temperature of the refrigerator is continuously compared with a temperature level set by a microprocessor.

When the detected interior temperature of the refrigerator exceeds the set temperature level, a cold shock operation is performed to cool the interior temperature of the storage compartment to a control temperature lower than a predetermined keeping temperature level for a predetermined period of time.

When the cold shock operation has been performed for the predetermined period of time, and therefore, the set operation time has elapsed, the control temperature is returned to the predetermined keeping temperature level.

When the interior temperature of the refrigerator detected by the temperature sensor reaches the cold shock operation control temperature, i.e., the cold shock temperature, during the cold shock operation, the cold shock operation is stopped, and the mode is returned to the keeping mode.

Figure 8:
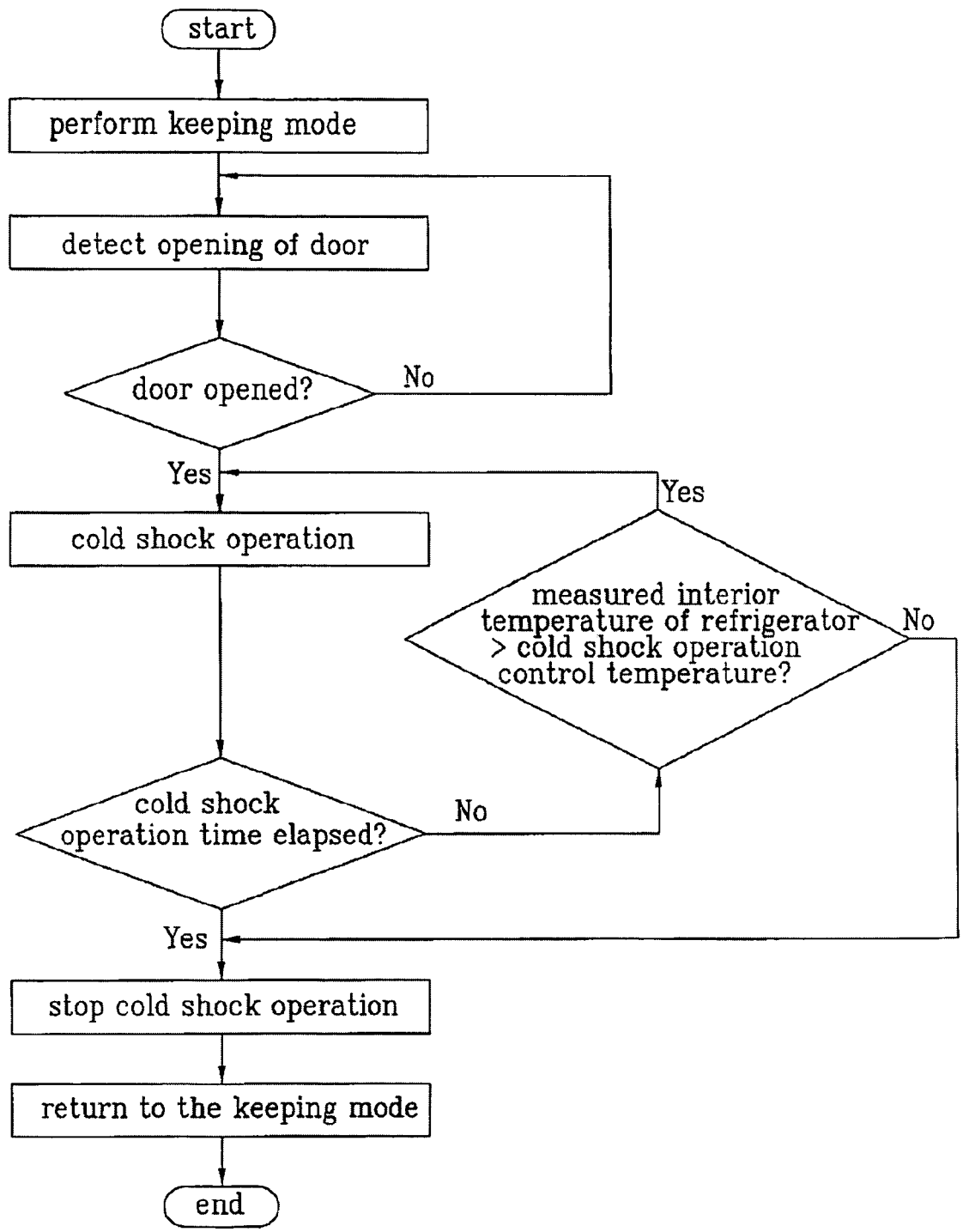
FIG. 8 is a block diagram illustrating a process for performing a cold shock operation when a door is opened and then closed.

FIG. 8 is a block diagram illustrating a process for performing a cold shock operation when a door is opened and then closed.

While the keeping mode is performed, the control unit continuously determines whether the door of the Kimchi refrigerator has been opened using a door sensor (not shown).

When it is determined that the door has been opened and then closed based on a signal from the door sensor, the control unit performs a cold shock operation in which the storage compartment is cooled to a control temperature lower than a predetermined keeping temperature level for a predetermined period of time.

When the cold shock operation has been performed for the predetermined period of time, and therefore, the set operation time has elapsed, the control temperature is returned to the predetermined keeping temperature level.

When the interior temperature of the refrigerator detected by the temperature sensor reaches the cold shock operation control temperature, i.e., the cold shock temperature, during the cold shock operation, the cold shock operation is stopped, and the mode is returned to the keeping mode.

It is natural that the control methods of FIGS. 7 and 8 may be used together with the above-described case in which the cold shock operation is repeatedly performed at the predetermined time intervals.

According to the present invention, it is possible to apply cold shock to Kimchi at a predetermined time interval, during the storage of the Kimchi, thereby maintaining the taste of the Kimchi without deterioration. Furthermore, it is possible to appropriately change the time interval of the cold shock operation, thereby more efficiently maintaining the taste of the Kimchi.

Also, it is possible to effectively correspond to environmental changes, such as the change of interior temperature of the refrigerator and the opening of the door of the refrigerator, so as to restrain the generation of a sour taste of Kimchi, thereby maintaining the taste of the Kimchi for a long period of time in a state in which the Kimchi provides a taste desired by the user.

In addition, when the taste of the Kimchi is suitable to user's taste during the storage of the Kimchi, it is possible for the user to press a specific button such that the taste of the Kimchi can be maintained for a long period of time.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Kimchi refrigerator comprising:
a cooling system to cool an interior of the refrigerator in which Kimchi is stored; and
a control unit to control the cooling system to change from a fermentation mode to a keeping mode, and to repeatedly perform, in the keeping mode, a cold shock operation at predetermined time intervals, wherein in the cold shock operation the interior of the refrigerator is cooled for a predetermined period of time to a cold shock temperature lower than a keeping temperature of the keeping mode, wherein the control unit changes the time intervals of the cold shock operation, and
wherein the fermentation mode is performed to ferment and ripen Kimchi, and the keeping mode is performed to store Kimchi after the fermentation mode, and
wherein the control unit controls the cooling system such that the cold shock operation is performed when a mode change is completed from the fermentation mode to the keeping mode and when the keeping mode is performed, and the cold shock operation is repeatedly performed at the time intervals,
wherein the control unit controls the cooling system such that the cold shock operation includes a plurality of cold shock operations, and a first cold shock operation is performed at a beginning of the keeping mode.

2. The Kimchi refrigerator according to claim 1, wherein the detection unit includes at least one weight sensor to detect a weight of the Kimchi received in the interior of the refrigerator.

3. The Kimchi refrigerator according to claim 1, further comprising:
a detection unit to detect an amount of the Kimchi received in the interior of the refrigerator, wherein
the control unit changes the time intervals based on the detected amount of the Kimchi.

4. The Kimchi refrigerator according to claim 3, wherein when it is determined that a door has been opened and closed by using a door sensor, the control unit controls the cooling system to perform the cold shock operation.

5. The Kimchi refrigerator according to claim 3, wherein when the interior temperature of the refrigerator detected by a temperature sensor exceeds a predetermined temperature level, the control unit controls the cooling system to perform the cold shock operation.

6. The Kimchi refrigerator according to claim 3, further comprising:
an input unit to allow a user to change the time intervals.

7. The Kimchi refrigerator according to claim 3, wherein when the interior temperature of the refrigerator is lowered to the keeping temperature so as to perform a mode change from the fermentation mode to the keeping mode, the control unit controls the cooling system to perform the cooling operation with at least one rapid cooling section that has a cooling speed faster than an average cooling speed for the mode change.

8. The Kimchi refrigerator according to claim 1, wherein the keeping mode includes a first keeping mode having a first keeping temperature and a second keeping mode having a second keeping temperature lower than the first keeping temperature.

9. The Kimchi refrigerator according to claim 8, further comprising:
an input unit to allow a user to input a command for a mode change from the first keeping mode to the second keeping mode.

10. The Kimchi refrigerator according to claim 9, wherein when the interior temperature of the refrigerator reaches the cold shock temperature, the control unit controls the cold shock operation to be stopped and controls the cooling system to increase the interior temperature of the refrigerator.

11. The Kimchi refrigerator according to claim 9, wherein the control unit controls the cooling system such that the interior temperature of the refrigerator is maintained at the cold shock temperature for a predetermined period of time.

12. The Kimchi refrigerator according to claim 8, wherein when a cooling operation is performed from the first keeping temperature to the second keeping temperature so as to perform a mode change from the first keeping mode to the second keeping mode, the control unit controls the cooling system to perform the cooling operation with at least one rapid cooling section that has a cooling speed faster than an average cooling speed for the mode change.

13. A control method of a Kimchi refrigerator, comprising:
performing a fermentation mode and a keeping mode, wherein the fermentation mode is performed to ferment and ripen Kimchi, and the keeping mode is performed to store the Kimchi after the fermentation mode;
repeatedly performing a cold shock operation at predetermined time intervals, wherein in the cold shock operation an interior of the refrigerator is cooled to a cold shock temperature lower than a keeping temperature of the keeping mode; and
changing the time intervals of the cold shock operation,
wherein the cold shock operation is performed when a mode change is completed from the fermentation mode to the keeping mode and when the keeping mode is performed, and the cold shock operation is repeatedly performed at the time intervals,
wherein the cold shock operation includes a plurality of cold shock operations, and a first one of the plurality of cold shock operations is performed upon a beginning of the keeping mode.

14. The control method according to claim 13, further comprising:
when the interior temperature of the refrigerator reaches the cold shock temperature, stopping the cold shock operation and increasing the interior temperature of the refrigerator.

15. The control method according to claim 13, further comprising:
when it is determined that a door of the refrigerator has been opened and closed by using a door sensor, performing a cold shock operation.

16. The control method according to claim 13, further comprising:
when the interior temperature of the refrigerator exceeds a predetermined temperature level, performing a cold shock operation.

17. The control method according to claim 13, further comprising:
receiving a user's input to change the time intervals.

18. The control method according to claim 13, further comprising:
performing a cooling operation for a mode change with at least one rapid cooling section that has a cooling speed faster than an average cooling speed for the mode change.

19. The control method according to claim 13, wherein changing the time intervals includes changing the time intervals based on an amount of the Kimchi.

20. The control method according to claim 19, wherein the amount of the Kimchi is detected by at least one weight sensor.

21. The control method according to claim 13, wherein the keeping mode includes a first keeping mode having a first keeping temperature and a second keeping mode having a second keeping temperature lower than the first keeping temperature.

22. The control method according to claim 21, further comprising:
receiving a user's command for a mode change from the first keeping mode to the second keeping mode.

23. A control method of a Kimchi refrigerator, comprising:
performing a fermentation mode in the Kimchi refrigerator;
performing a keeping mode in the Kimchi refrigerator;
performing a first cold shock operation in the Kimchi refrigerator in response to a completion of a mode change of the Kimchi refrigerator from the fermentation mode to the keeping mode;
performing a second cold shock operation after a time interval from the first cold shock operation;
changing the time interval of the cold shock operation; and
repeatedly performing a third shock operation at the changed time interval, wherein in the first, second and third cold shock operations an interior of the refrigerator is cooled to a cold shock temperature lower than a keeping temperature of the keeping mode,
wherein the first cold shock operation is performed upon a beginning of the keeping mode.

24. The control method according to claim 23, further comprising:
when the interior temperature of the Kimchi refrigerator reaches the cold shock temperature, stopping the cold shock operation and increasing the interior temperature of the refrigerator.

25. The control method according to claim 23, further comprising:
when it is determined that a door of the Kimchi refrigerator has been opened and closed by using a door sensor, performing a cold shock operation.

26. The control method according to claim 23, further comprising:
when the interior temperature of the refrigerator exceeds a predetermined temperature level, performing a cold shock operation.

27. The control method according to claim 23, further comprising:
receiving a user's input to change the time interval.

28. The control method according to claim 23, wherein changing the time interval includes changing the time interval based on an amount of the Kimchi.

29. The control method according to claim 28, wherein the amount of the Kimchi is detected by at least one weight sensor.

30. The control method according to claim 23, wherein the keeping mode includes a first keeping mode having a first keeping temperature and a second keeping mode having a second keeping temperature lower than the first keeping temperature.

31. The control method according to claim 30, further comprising:
receiving a user's command for a mode change from the first keeping mode to the second keeping mode.

* * * * *